United States Patent [19]

Cesaratto

[11] 4,122,534

[45] Oct. 24, 1978

[54] PARALLEL BIDIRECTIONAL SHIFTER

[75] Inventor: Caesar Cesaratto, Alymer, Canada

[73] Assignee: Northern Telecom Limited, Montreal, Canada

[21] Appl. No.: 807,429

[22] Filed: Jun. 17, 1977

[51] Int. Cl.² .................. G11C 19/00; G06F 1/00
[52] U.S. Cl. .................................................. 364/900
[58] Field of Search ... 364/200 MS File, 900 MS File, 364/715, 757

[56] References Cited

U.S. PATENT DOCUMENTS

| 3,535,694 | 10/1970 | Anacker | 364/200 |
| 3,790,960 | 2/1974 | Amdahl | 364/900 |
| 3,914,744 | 10/1975 | Brown | 364/900 |

*Primary Examiner*—James D. Thomas
*Attorney, Agent, or Firm*—Frank Turpin

[57] ABSTRACT

A circuit for shifting a binary data word having N-bits any number up to N-1 positions left or right is described. A shifting network having a plurality of levels for shifting a binary word a predetermined number of positions in only one predetermined direction is cross-connected to a register such that the register stores the mirror image of the binary word appearing at the output of the shifting network. The output of the register is connected back to the input of the shifting network. By passing an input data word twice through the device, it can be shifted left or right any number of positions.

6 Claims, 7 Drawing Figures

| INPUT DATA BUS | 1 | 1 | 0 | 1 | 0 | 1 | 0 | 0 | 1 | 1 | 1 | 0 | 1 | 1 | 0 | 1 | |
|---|---|---|---|---|---|---|---|---|---|---|---|---|---|---|---|---|---|
| SHIFTING NETWORK OUTPUT (1) | 0 | 1 | 1 | 1 | 0 | 1 | 1 | 0 | 1 | 0 | 0 | 0 | 0 | 0 | 0 | 0 | (Sh.L-9) |
| ACCUMULATOR REGISTER | 0 | 0 | 0 | 0 | 0 | 0 | 0 | 1 | 1 | 0 | 1 | 1 | 0 | 1 | 1 | 0 | |
| SHIFTING NETWORK OUTPUT (2) | 0 | 0 | 0 | 0 | 0 | 0 | 0 | 1 | 1 | 0 | 1 | 1 | 0 | 1 | 1 | 0 | (Sh.-0) |
| OUTPUT DATA BUS | 0 | 1 | 1 | 1 | 0 | 1 | 1 | 0 | 1 | 0 | 0 | 0 | 0 | 0 | 0 | 0 | (Sh.L-9) |

FIG. 5

| INPUT DATA BUS | 1 | 1 | 0 | 1 | 0 | 1 | 0 | 0 | 1 | 1 | 1 | 0 | 1 | 1 | 0 | 1 | |
|---|---|---|---|---|---|---|---|---|---|---|---|---|---|---|---|---|---|
| SHIFTING NETWORK OUTPUT (1) | 1 | 1 | 0 | 1 | 0 | 1 | 0 | 0 | 1 | 1 | 1 | 0 | 1 | 1 | 0 | 1 | (Sh.-0) |
| ACCUMULATOR REGISTER | 1 | 0 | 1 | 1 | 0 | 1 | 1 | 1 | 1 | 0 | 0 | 1 | 0 | 1 | 0 | 1 | 1 |
| SHIFTING NETWORK OUTPUT (2) | 0 | 1 | 0 | 1 | 0 | 1 | 1 | 1 | 0 | 0 | 0 | 0 | 0 | 0 | 0 | 0 | (Sh.L-9) |
| OUTPUT DATA BUS | 0 | 0 | 0 | 0 | 0 | 0 | 0 | 0 | 0 | 1 | 1 | 1 | 0 | 1 | 0 | 1 | 0 | (Sh.R-9) |

FIG. 6

| BITS | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|
| | | | D | | | | | | | | W | | | | | | |
| INPUT DATA BUS | 1 | 1 | 0 | 1 | 0 | 1 | 0 | 0 | 1 | 1 | 1 | 0 | 1 | 1 | 0 | 1 | |
| SHIFTING NETWORK OUTPUT (1) | 1 | 1 | 0 | 1 | 1 | 0 | 1 | 0 | 0 | 0 | 0 | 0 | 0 | 0 | 0 | 0 | |
| ACCUMULATOR REGISTER | 0 | 0 | 0 | 0 | 0 | 0 | 0 | 0 | 1 | 1 | 0 | 1 | 1 | 0 | 1 | 1 | |
| SHIFTING NETWORK OUTPUT (2) | 1 | 0 | 1 | 1 | 0 | 0 | 0 | 0 | 0 | 0 | 0 | 0 | 0 | 0 | 0 | 0 | |
| OUTPUT DATA BUS | 0 | 0 | 0 | 0 | 0 | 0 | 0 | 0 | 0 | 0 | 0 | 0 | 1 | 1 | 0 | 1 | |

FIG. 7

PARALLEL BIDIRECTIONAL SHIFTER

The invention relates to a data processor generally and more particularly to a circuit for the bidirectional shifting and data handling of a binary word.

It is well known in the data processor art to provide a means for shifting the relative positions of bits in a binary word. It is equally well known to provide circuit means to mask a first portion of a binary word to isolate the second portion thereof for further processing.

In the case of a byte-by-byte processor, it is well known to provide the shifting function by using a pair of memories, a shifting circuit and logic circuitry for rearranging the relative positions of the bits as they are transferred from one memory to the other. Such a circuit is described in U.S. Pat. No. 3,996,566 issued to J. C. Moran.

In the case of processors which operate on the full binary word, it is also well known to achieve the shifting function by means of a shifting network which shifts the data at a plurality of levels. For example, such a circuit is described in U.S. Pat. No. 3,596,251 issued on July 27, 1971 to J. S. Buchan and F. P. Turpin and assigned to applicant's assignee. This patent describes a logical shifting device having a plurality of levels, each of which includes a left shift logical unit, a no-shift logical unit and a right shift logical unit. These units are logically interconnected to permit an input binary word comprising N-bits to be shifted left or right by up to N-1 positions. During shifting, a binary word to be shifted is allowed to propagate through one of the logical units at each level and the time taken for a shifting operation is constant for all magnitudes of shift. That device has been found to be completely adequate for its intended purpose of shifting the relative position of bits in a binary word but it is not well adapted to perform other logical functions.

It is an object of this invention to provide a parallel bidirectional shifter and data handler which exhibits advantages over the prior art circuits. It is a feature of the invention that the circuit may be used to efficiently isolate a field of data within an input binary word whereby the field is right justified; that is, the output binary word contains only the isolated bits located at the least significant positions of the word. It is also a feature of the circuit of the invention that it may be realized using a minimum of components and of the type which are available commercially on an off-the-shelf basis. It is a further feature of the invention that any function of the circuit may be completed in minimum real time and in which the time taken to complete any operation is constant.

In accordance with the invention, there is provided a circuit for shifting a binary word having N bits any number up to N-1 positions left or right. A shifting network is used to shift an input binary word a predetermined number of positions in one predetermined direction. An accumulator register is logically connected to the shifting network to store the mirror image of the binary word appearing at the output of the shifting network. A shift control circuit under control of a processor enables the appropriate portions of the shifting network to obtain the desired shift quantity and the input binary word is circulated twice through the shifting network and the accumulator register for any one operation.

Because the circuit performs the shifting function using two microinstructions, the second one being performed on the mirror image data resulting from the first instruction, the data field isolation (masking) function may be efficiently performed using the same circuit and in minimum real time.

These and other aspects of the invention will become clearer upon consideration of the following example embodiment of the invention in conjunction with the drawings in which:

FIGS. 5-7 illustrate binary words appearing at different points in the circuit of FIG. 2 for different functions.

The following example embodiment of the invention is a circuit adapted to operate on a binary word having 16 bits (0-15). It should be realized that a bidirectional shifting and data handling circuit using the invention may be constructed to operate on binary words of any length.

Figure 1:
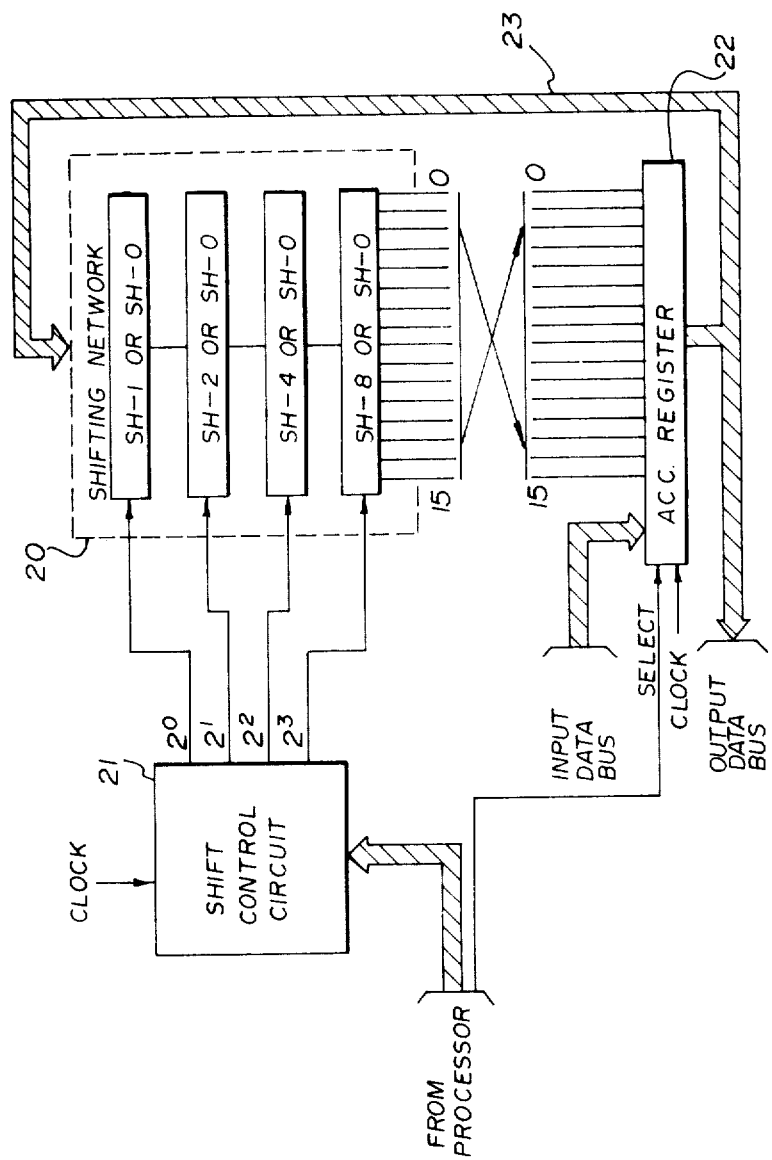
FIG. 1 is a block diagram of a parallel bidirectional shifting circuit in accordance with the invention.

FIG. 1 shows a shifting network 20 having four levels identified as SH-1 or SH-0, SH-2, or SH-0, SH-4 or SH-0 and SH-8 or SH-0. These are logically interconnected as described below and each level is adapted to shift an input data word a predetermined number of positions or zero position. A shift control circuit 21 is responsive to clock signals and to a four-bit data field from a microprocessor data register (not shown) for providing the enabling signals ($2^0$, $2^1$, $2^2$, $2^3$) for the corresponding levels of the shifting network 20. An accumulator register 22 has a selective gating input for accepting data from an input data bus or from the shifting network 20. The accumulator register 22 is controlled by a select control signal from the microprocessor and clock signals. The parallel output leads 0–15 of the shifting network 20 are cross-connected to the 16 inputs 15–0 of the register 22 such that the register 22 stores the mirror image of the binary word appearing at the output of the shifting network 20. The outputs from the register 22 are connected to a bus 23 which serves as the output data bus for the device and as a circulating bus for feeding the output data from the register 22 back to the input of the shifting network 20.

Figure 2:
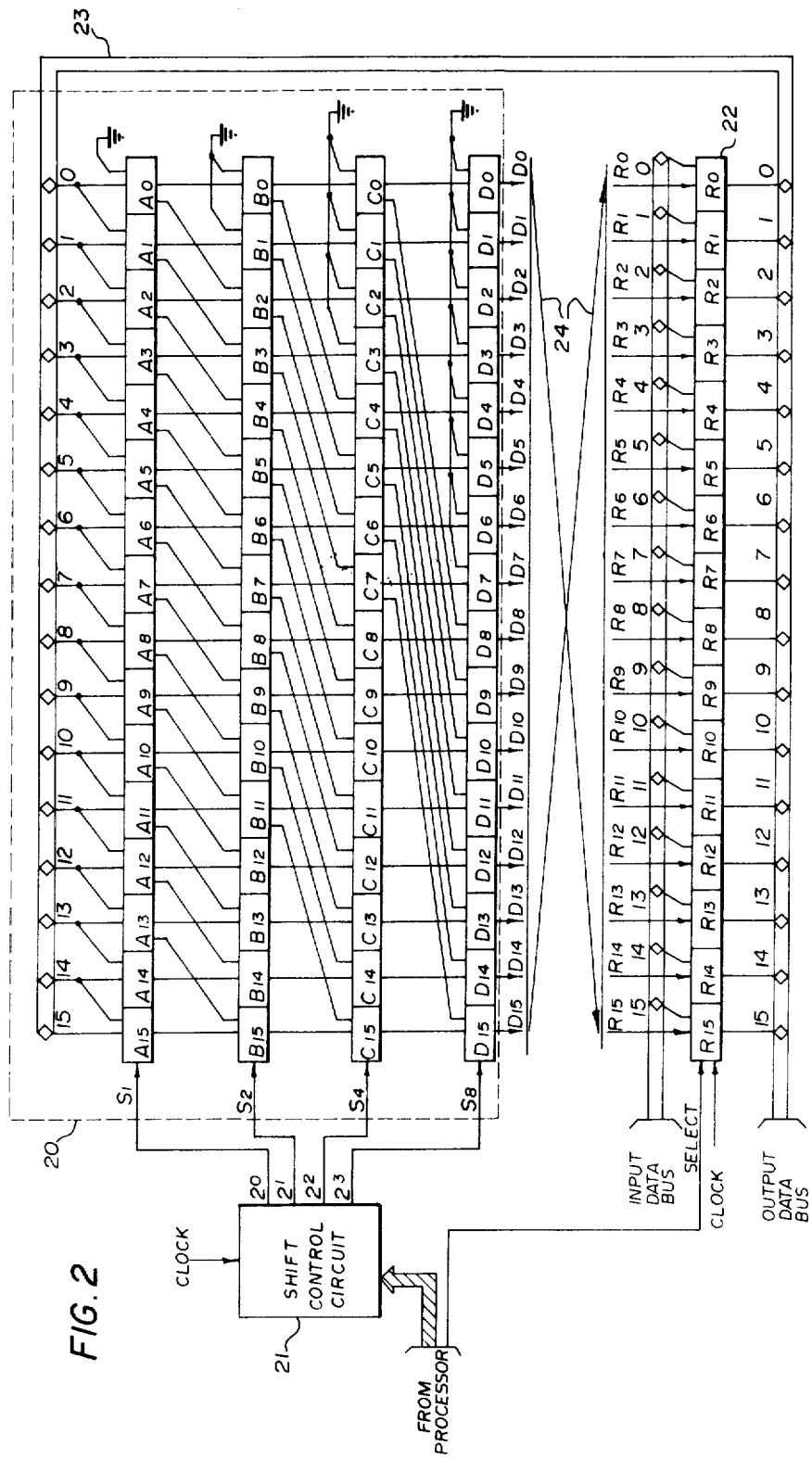
FIG. 2 is a schematic block diagram of the circuit shown in FIG. 1.

FIG. 2 is a schematic diagram of the circuit of FIG. 1. The shift control circuit 21 is not shown in any greater detail than it is in FIG. 1 since it may simply be a register controlled by the clock signals for providing the four enable signals S1, S2, S4 and S8 corresponding to the four levels of shifting gates in the network 20.

Figure 3:
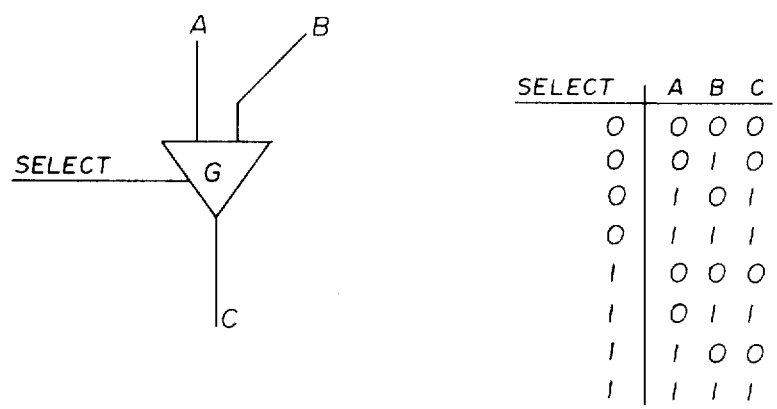
FIG. 3 is a schematic diagram of one of the gates illustrated in FIG. 2 together with the associated truth table.

Each shifting level in the network 20 comprises 16 gates A0–A15, B0–B15, C0–C15 and D0–D15. Each of these gates has a pair of inputs either of which may be selected by a control signal (S1, S2, S4, S8). FIG. 3 illustrates one such gate together with a truth table showing the operation of the gate. When the select or enable lead is idle, the gate G allows the data on input lead A to appear on the output lead C and when the select lead is enabled, the gate G allows the data on input B to appear on the output lead C. This type of gate is available commercially as an off-the-shelf component and is commonly known as a dual-input data select gate.

The gates at each level of the shifting network are logically connected to the gates at the previous level for shifting the binary word a predetermined number of positions to the left. For example, each of the gates A0–A15 at the first level is connected to two leads of the bus 23. If the lead S1 is not enabled the gates A0–A15 have no effect on the data word appearing on the bus 23 other than allowing it to appear at their output; however, if the lead S1 is enabled, the gates A0–A15 effectively shift the data appearing on the bus 23 one position to the left. Similarly, the gates B0–B15 at the second level are adapted to not shift (lead S2 not enabled) or to shift (lead S2 enabled) the data appearing at the output of the first level gates A0–A15, two positions to the left. The gates at the third and fourth levels are similarly adapted to not shift or to shift left four and eight positions respectively. Therefore, by allowing a binary word having N-bits to propagate through the four levels of the shifting network 20 and by selectively enabling the levels thereof, the binary word appearing at the output of the shifting network may reflect a shift-left of any number of positions up to N-1.

The accumulator register 22 comprises 16 flip-flops (R0–R15) each having two-input selective gates of the type previously described. These elements are also available commercially as off-the-shelf components. A first set of inputs to the elements R0–R15 are respectively connected to the leads of an input data bus. A binary data word appearing on that bus may be loaded in register 22 on a clock signal and by enabling the select lead. This signal is normally generated in the microprocessor (not shown) of the system. A second set of inputs (R0–R15) to the elements R0–R15 of the register 22 are cross-connected to the outputs D0–D15 of the network 20. These cross-connections are represented by the intersecting arrows 24. Effectively, output D0 is connected to input R15, D1 to R14, D2 to R13, D3 to R12, D4 to R11 . . . and D15 to R0. Therefore, register 22 stores the mirror image of the binary data word which appears at the output of the network 20.

The outputs of elements R0–R15 in the register 22 are connected to a bus 23 which serves as the output data bus for the device and also serves to feed back to the input of the shifting network 20 the binary data word appearing at the output of register 22.

It should be understood that the input data bus is only connected to the input of the register 22 for convenience. It could just as well be connected directly to the input of the shifting network 20.

Operation

Figure 4:
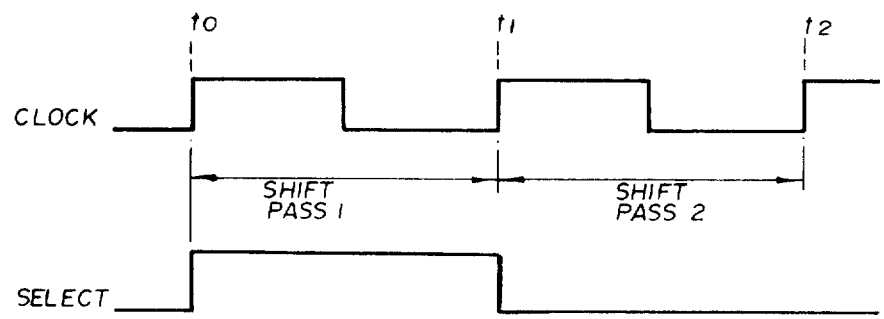
FIG. 4 is a timing diagram depicting the operation of the circuit of FIG. 2.

A greater understanding of the above described circuit may be obtained from the following description of operation in conjunction with the timing diagram of FIG. 4 and the examples illustrated in FIGS. 5 to 7.

The binary word to be shifted is applied to leads 0–15 of the input data bus. At the same time, the select lead is enabled (one level), and the shift quantity data field is sent to the shift control circuit 21. On the occurrence of the next clock pulse ($t_o$, FIG. 4) the appropriate levels of the shifting network 20 are enabled, the binary data word on the input data bus is loaded into register 22 and appears at the input of the network 20 via bus 23 and propagates therethrough. At the next clock pulse ($t_1$, FIG. 4) this data is loaded into register 22 and the operation is repeated except that the select control lead is not enabled (zero level). FIGS. 5 to 7 illustrate the operation on a binary word to achieve various functions.

FIG. 5 illustrates the operation on a binary word to achieve a shift-left of seven positions. On the first pass through the device, the binary word is shifted left seven positions (levels 1, 2 and 3 are enabled) however, the resultant word is mirror-imaged in the register 22 because of the cross-connections 24. On the second pass the shifting network is not enabled at any level and because of the cross-connections 24, the register 22 contains the desired binary data word which is available on the output data bus.

FIG. 6 illustrates the operation on a binary word to achieve a shift-right of nine positions. On the first pass through the network none of the levels are enabled, but because of the cross-connections 24, the binary word in the register 22 is the mirror image of the input data bus binary word. On the second pass through the network 20, the binary data word now in register 22 is shifted left nine positions (levels 1 and 4 are enabled) and loaded again into the register 22 via the cross-connections 24. The binary data word now in the register 22 reflects a shift of nine positions to the right relative the original binary data word and is now available on the output data bus.

FIG. 7 illustrates the operation on a binary data word to achieve the isolation of a data field within the word. It is desired to isolate the data field comprising bits 3 to 6 of the binary word and to locate it at the least significant positions of the word. On the first pass through the network, the word is shifted left nine positions (levels 1 and 4 enabled) and because of the cross-connections 24, the resultant data word in register 22 contains the mirror-image of the data field located at the least significant positions, with the bits 0, 1 and 2, adjacent thereto. These are removed from the word by passing it again through the shifting network with a left shift of 12 positions (levels 3 and 4 enabled). The resultant binary word in register 22 contains the required data field located at the least significant positions of the word with the remainder of the bits in the word being zeros.

Generally, the operation of the circuit may be summarized as follows. For a left shift of Y bit positions of a binary word having N bits — the binary word is shifted Y positions left on the first pass through the circuit and is shifted zero positions on the second pass. For a shift right of X bit positions — the binary word is shifted zero positions on the first pass through the circuit and is shifted X positions left on the second pass. If it is desired to isolate and right justify a data field W bits wide which is D bit positions from the most significant edge of the word — the binary word is shifted D positions on the first pass through the circuit and is shifted N-W positions on the second pass.

As is depicted in the above examples, each shifting function left or right, and each data field isolation or masking function requires two passes through the device. These correspond to two microinstructions of a microprocessor which with current technology can readily operate on about a fifty nanoseconds per instruction basis. Therefore, the invention provides a bidirectional parallel shifter and data handling circuit which performs all of its intended functions in constant time and in minimum real time. It has the added advantages that it is simple, economical, and may be realized using commercially available off-the-shelf components. These advantages are accrued partly because only the hardware necessary for shifting in one direction is required.

The embodiment of the invention described above uses a shifting network for shifting a binary data word to the left. It should be realized that the invention applies just as well to a shifting device using a shift right network. It is only a matter of inverting and interchanging the shifting functions of the first and second passes through the device. For example, let us consider the case of FIG. 5 where it is desired to obtain a shift of seven positions left using a right-shifting network. On the first pass through the network, none of the levels are enabled (no-shift) and the word in register 22 is the mirror image of the original word. On the second pass, the word in register 22 is shifted right seven positions and mirror-imaged due to the cross-connections 24. The resultant word in register 22 reflects a shift left of seven positions relative the original word. Of course, it should be realized that if a right-shifting network is used, the masking function results in the bits of the isolated field being left-justified; that is, the field occupies the most significant positions of the word in the accumulator register.

What is claimed is:

1. A parallel bidirectional shifter circuit for shifting a binary data word having N-bits any number up to N-1 positions left or right, comprising, a shifting network for shifting a binary data word any number up to N-1 positions in one predetermined direction, the shifting network having N output leads; and a data register having N storage locations and N input leads, the output leads of the shifting network being cross-connected to the input leads of the register such that a binary word loaded therein from the shifting network is the mirror image of the binary word appearing at the output of the network, the ouput of the register being connected back to the input of the shifting network.

2. A parallel bidirectional shifter circuit for shifting a binary data word having N-bits any number up to N-1 positions left or right comprising, a shifting network having a plurality of shifting levels each comprising a plurality of gates; the gates at each level of the network being logically connected to the gates at the previous level for shifting a binary data word at the output thereof a predetermined number of positions in one predetermined direction, said gates at each level being also logically connected to the gates at the previous level for transmitting a binary data word at the output thereof without positional shift; means for receiving signals for controlling the operation of said gates at each level; and a data register having its input cross-connected to the output of the shifting network such that a binary word loaded in the register from the network is the mirror image of the binary data word appearing at the output thereof, the output of the register being connected back to the input of the shifting network.

3. A shifter circuit as defined in claim 2 wherein each of the gates at each level of the shifting network is a dual-input data select gate.

4. A shifter circuit as defined in claim 3 and further comprising, a plurality of input and output terminals for connection to input and output data buses respectively and wherein each storage element of the data register includes a dual-input data select gate having a first input connected to one of said input terminals, a second input cross-connected to the shifting network, and an output connected to the input of the storage element, the output of each storage element being also connected to a respective one of said output terminals, and means for receiving signals for controlling the operation of the data select gates.

5. A shifter circuit as defined in claim 4 and further comprising means for receiving signals for controlling the loading of an input data word into said data register and for circulating said word twice through the shifting network and data register.

6. A method of shifting an input binary data word having N-bits any desired number up to N-1 positions left or right using a shifting network adapted to shift a binary word any number up to N-1 positions in only one predetermined direction, comprising the steps of:

passing the input binary word through the shifting network a first time to impart to it a first positional shift in said one direction, interchanging the relative position of the bits in the binary word resulting from the first pass to form the mirror-image thereof, passing the mirror-image word through the switching network to impart to it a second positional shift in said one direction, and interchanging the relative position of the bits in the binary word resulting from the second pass through the network to form the mirror-image thereof whereby the second formed mirror-image word reflects the desired positional shift left or right of the original binary word.

* * * * *